Patented Apr. 6, 1954

2,674,539

UNITED STATES PATENT OFFICE 2,674,539

HIGH TEMPERATURE REFRACTORY PRODUCTS

Isaac Harter, Beaver, Pa., and Charles L. Norton, Jr., New York, N. Y., assignors to The Babcock & Wilcox Company, Rockleigh, N. J., a corporation of New Jersey No Drawing. Original application July 19, 1946, Serial No. 684,686. Divided and this application January 29, 1949, Serial No. 73,645

7 Claims. (Cl. 106—50)

The present invention relates to the continuous melting of ceramic refractory materials having a high fusion temperature, such as, for example, fireclays, kaolins, bauxite, kyanite, etc., all of which have a fusion temperature above 2900 F., and utilization of the melted product for the manufacture of improved refractory fiber.

Materials having melting temperatures above 2900 F. have been heretofore melted commercially in electric furnaces, but in view of the high initial investment, the relatively low efficiency, and high operating charges, such apparatus is not commercially practicable for melting large quantities of material for use in relatively low cost products. Furthermore, the atmosphere in the melting zone of an electric arc melting furnace is inherently reducing, preventing the use of such apparatus for the melting of any materials for which a neutral or oxidizing atmosphere is required or desirable in the melting zone.

Some refractory materials, such as those widely used commercially for the manufacture of glass or slag wool, for example, can be readily melted in a cupola by mixing and burning coke therewith due to the relatively low fusion temperature of such materials usually in the range of 1500–2500 F. Where the raw material has a fusion temperature in the higher portion of this range, it is customary to add varying amounts of a flux, such as limestone, dolomite, fluorspar, or feldspar, to lower the fusion point of the resulting mixture to the desired value. Continuous operation over long operating periods and with substantial rates of melt production can be readily attained under such conditions. The molten mass flows out of the cupola at a temperature usually in the range of 2100–2600 F. in a stream which can be attenuated to fiber by various methods, such as blasting the stream with high velocity air or steam to shred the molten material into fibers of various lengths. The cupola product can be controlled to some extent by varying the rock-coke ratio of the charge, but this involves a lag of several hours before becoming effective.

One of the principal uses of mineral wool of the character described is for heat insulation. The upper use temperature limit for such material is determined by the temperature at which recrystallization occurs therein to an extent that embrittlement and loss of strength in the fibers result. At this temperature, known as the "devitrification" temperature, the material changes from a glassy to a crystalline structure. Tests of the best known commercial brands of mineral wool now on the market have shown none in satisfactory condition after a twenty-four hour exposure at 1350 F. due to excessive recrystallization at that temperature. The manufacturers' recommended upper use temperature limits for these mineral wools are therefore confined to the range of 900–1200 F.

The general object of this invention is the provision of improved refractory fiber formed by the melting of alumina-silica refractory materials, such as fireclays, kaolins, bauxite, kyanite, sillimanite and topaz, having a fusion point in the range 2900–3350 F. A further object is the provision of a mineral wool having a permissible maximum use temperature above 2000 F., a very low alkali content, high flexibility and strength, low thermal conductivity, and high resistance to water vapor attack at high temperatures.

Suitable apparatus for making the improved high temperature mineral wool of our invention is described and claimed in our prior application, Serial No. 684,686, filed July 19, 1946, now abandoned, of which this application is a division, and in general consists of a melting furnace or pot fired with a low cost fluid fuel in the presence of combustion air supplied at a regulable high temperature from an independently heated pebble type air preheater, to maintain a uniform flame temperature in the furnace substantially above 3000 F., and a rotary kiln in which the alumina-silica material is preheated by gaseous products of combustion from the melting furnace before being discharged into the furnace.

Kaolins or china clay are a highly desirable refractory raw material because of their relatively high purity, firing to a white color and availability at relatively low cost. Kaolins have a fusion temperature of about 3245 F., and one Georgia kaolin, for example, was found to have a chemical analysis of approximately

| | Percent |
|---|---|
| Silica | 45.30 |
| Alumina | 39.14 |
| Titanium oxide | 1.54 |
| Iron oxide | 0.27 |
| Lime | 0.13 |
| Magnesia | 0.04 |
| Potash | 0.15 |
| Soda | 0.10 |
| Ignition loss | 13.71 |

When kaolins are used as the material to be melted in the described operation, the material is supplied either in the raw state or as a sintered grog and is heated to a temperature above 2800 F. in the rotary, leaving the rotary in small lumps of ½ to 1 in. maximum dimension. With this material the melting chamber temperature will be continuously maintained in the range of approximately 3400–3500 F. In normal operation, the supplies of material to the rotary and the melting rate are proportioned to provide a substantially continuous discharge of molten kaolin over long periods depending upon the subsequent treatment to be given the melt. Laboratory attempts to melt kaolin in a graphite pot in an electrically heated induction furnace were unsuccessful because the silica ($SiO_2$) content volatilized as a fume, leaving a liverlike residue in the pot. With the oil fired melting process described however, the melted kaolin has the consistency or viscosity of thin cream.

The molten or fused kaolin and other refractory materials on discharging from the melting pot can be advantageously utilized for the manufacture of various high temperature refractory products. Molten kaolin has proved to be particularly advantageous when made into a high temperature mineral wool, such as by the use of a blow pipe arranged below the melting pot in a position to discharge a high velocity stream of air or steam across the falling stream of melted kaolin to shred the melt into fibers of various lengths and deposit the fibers produced in a collecting chamber. While melted kaolin when slowly cooled forms a mullite-silica glass aggregate, when very rapidly quenched in air or water it will form a transparent or translucent non-crystalline glass. The fused kaolin fibers in the chamber are found to have the following chemical analysis:

| | Percent |
|---|---|
| $Al_2O_3$ | 45.5 |
| $SiO_2$ | 50.5 |
| $Fe_2O_3$ | 0.6 |
| $TiO_2$ | 2.1 |
| $CaO+MgO$ | 0.4 |
| $P_2O_5$ | 0.4 |

The high alumina content and extremely low alkali content are particularly advantageous in mineral wool in increasing the maximum permissible use temperature of the material particularly under corrosive conditions due to the high resistance to leaching by contacting solutions. In contrast to wools made in a cupola, the kaolin wool described is further characterized by an absence of carbon therein. The kaolin wool produced in accordance with the described method is a white fluffy fibrous material having the appearance of absorbent cotton, but somewhat more stiff and bristling.

Tests of the heat insulating properties of kaolin wool by an independent industrial laboratory showed that it was quite superior to twenty different commercial brands of fibrous insulating materials previously tested. The kaolin wool fibers were not affected by water vapor attack at high temperatures, a condition very damaging to most other fibrous insulations. The permissible use temperature was confined to be over 1000° F. higher than the best commercial brands of high temperature fibers available. It was found on test that a three-inch thick kaolin wool heat insulating blanket produced the same cold surface temperature (155–160 F.) with a hot surface temperature of 1000 F. as two three-inch thick blankets of "Fiberglas" insulation, "Fiberglas" being a trade name for spun or drawn fibers of glass molded into a batt.

Flexible batts of kaolin wool for high temperature service can advantageously be made by using a high temperature stainless steel wire mesh on the hot inner face of the batt joined to a cover of asbestos cloth on the cold face, with the kaolin wool packed therein at a density of approximately 10 lbs./cu. ft.

Comparative tests of Fiberglas and kaolin wool have indicated the following different properties:

| Property | Fiberglas | Kaolin Wool |
|---|---|---|
| Diameter—microns | 3–7 | 2–4 |
| Aver. Young's Modulus,[1] lbs./sq. in. | $6.64 \times 10^6$ | $12.9 \times 10^6$ |
| Flexibility coefficient [1] | $1.99 \times 10^{-2}$ | $2.39 \times 10^{-2}$ |
| Strength [1] (breaking stress, lbs./sq. in.) | 132,000 | 308,000 |
| Permeability with air vel., 300 ft./min.: | | |
| Packed at 7 lbs./cu. ft. Press. drop in $H_2O$ | 8.25 | 19.75 |
| Packed at 10 lbs./cu. ft. Press. drop in $H_2O$ | 15 | 28.25 |
| Permissible use temp., F.: | | |
| long time | 1,000° F | 2,000 |
| short time | 1,200° F | 2,300 |
| Melting temp., F | about 1,800 | 3,180 |

[1] Tests for Young's Modulus, flexibility coefficient and calculated strength followed the procedure described in an Article—"The Strength of Glass Fibers"—Parts I and II, by J. B. Murgatroyd, Journal, Society of Glass Technology, December 1944.

The specific gravity of the kaolin fibers was approximately 2.62. The index of refraction was found to be between 1.550 and 1.545. Samples of the kaolin wool were reheated to various temperatures up to 3200 F. No recrystallization occurred below 2600 F. At temperatures between 2350 and 2600 F. some change in material took place as the heavier fibers became visible under crossed Nicol prisms but no recrystallization was noted. A well defined recrystallization occurred when heated to 2600 F., but the crystals were too small to identify. Melting took place when the fibers were heated to 3200 F. and large mullite crystals were present. The fibers were given bending tests and found to retain their good resiliency after heating to temperatures as high as 2400 F. for five hours. The foregoing tests indicated that the fibers were substantially pure chilled kaolin. With the described properties these fibers can be safely used for short periods (e. g. 5–6 hours) at temperatures ranging upwards to 2300 F. and very much longer periods at temperatures up to 2000 F. as thermal, sound and electrical insulation and for other purposes.

An excellent mullite wool suitable for high temperatures of the order stated for kaolin wool can also be made by the described process and apparatus. In this case a mullite composition such as the following batch:

| | Pounds |
|---|---|
| Calcined Dutch Guiana bauxite (48 mesh) | 56.7 |
| Calcined kaolin grog (40 mesh) | 32.0 |
| Raw kaolin | 20.0 | was charged to the melting pot. Since the impurities in the mix can be neglected, the above proportions will produce a mullite composition with the following chemical analysis:

| | Percent |
|---|---|
| $Al_2O_3$ | 68.1 |
| $SiO_2$ | 26.5 |
| $Fe_2O_3$ | 2.1 |
| $TiO_2$ | 2.7 |

The mullite wool appeared to be slightly finer and softer than the kaolin wool.

We claim:

1. As a new product, mineral wool consisting of fibers of a flame-melted alumina-silica refractory material having an alkali content less than 0.75% and being white in color and free from carbon constituents, said material having a melting temperature in the range 2900–3350 F. and a recrystallization temperature above 2500 F.

2. As a new product, mineral wool consisting of fibers of chilled non-crystalline kaolin having a devitrification temperature above 2000 F., white in color and free from carbon constituents.

3. As a new product, mineral wool consisting of fibers of a flame-melted alumina-silica refractory material having a melting temperature in the range 2900–3350 F. and an alkali content less than 0.75%, said fibers being white in color and free from carbon constituents.

4. As a new product, mineral wool consisting of fibers of a flame-melted alumina-silica refractory material having a melting temperature in the range 2900–3350 F. and a devitrification temperature above 2000 F., said fibers being white in color and free from carbon constituents.

5. As a new product, mineral wool consisting of fibers of substantially pure chilled kaolin white in color and free from carbon constituents.

6. As a new product, mineral wool consisting of fibers of substantially pure chilled kaolin white in color and free from carbon constituents, said fibers being 2–4 microns in diameter and having a specific gravity of approximately 2.62.

7. As a new product, mineral wool consisting of fibers of a fused alumina-silica refractory material having a melting temperature in the range 2900–3350 F., said fibers having a recrystallization temperature above 2500 F., an alumina content between about 45 and 69%, a silica content between about 26 and 51%, an alkali content less than 0.75%, and being white in color and free of carbon constituents.

References Cited in the file of this patent

UNITED STATES PATENTS

| Number | Name | Date |
|---|---|---|
| 1,527,874 | Hood | Feb. 24, 1925 |
| 1,741,920 | Curtis | Dec. 31, 1929 |
| 1,786,482 | Curtis | Dec. 30, 1930 |
| 2,017,056 | Easter | Oct. 15, 1935 |
| 2,044,817 | Schroeder | June 23, 1936 |
| 2,467,889 | Harter et al. | Apr. 19, 1949 |

FOREIGN PATENTS

| Number | Country | Date |
|---|---|---|
| 165,052 | Great Britain | 1921 |
| 495,654 | Great Britain | 1938 |
| 289,436 | Italy | 1931 |